United States Patent [19]

Jadamus et al.

[11] Patent Number: 4,800,120

[45] Date of Patent: Jan. 24, 1989

[54] STRUCTURAL COMPONENTS MADE FROM A FIBROUS REINFORCING SUPPORT AND RUBBER AND METHODS FOR THEIR MANUFACTURE

[75] Inventors: Hans Jadamus; Klaus-Peter Richter, both of Marl, Fed. Rep. of Germany

[73] Assignee: Huls Aktiengesellschaft, Marl, Fed. Rep. of Germany

[21] Appl. No.: 49,336

[22] Filed: May 13, 1987

[30] Foreign Application Priority Data

May 13, 1986 [DE] Fed. Rep. of Germany ....... 3615965

[51] Int. Cl.$^4$ ............................................. B32B 27/00
[52] U.S. Cl. .................................... 428/286; 428/284; 428/288; 428/290; 428/295; 428/411.1; 428/492; 428/521; 428/522; 428/293
[58] Field of Search ............... 428/288, 289, 290, 293, 428/295, 284, 282, 286, 297, 250, 252, 492, 413, 411.1, 521, 522, 245, 246; 524/504, 508, 505, 525; 525/133, 132

[56] References Cited

U.S. PATENT DOCUMENTS

| | | | |
|---|---|---|---|
| 3,380,878 | 4/1968 | Wheeler, III | 428/286 X |
| 3,380,880 | 4/1968 | Wheeler, III | 428/286 |
| 3,383,435 | 5/1968 | Cizek | 525/133 X |
| 4,167,507 | 9/1979 | Haaf | 524/505 X |
| 4,169,186 | 9/1979 | Tazaki et al. | |
| 4,172,929 | 10/1979 | Cooper et al. | 428/409 X |
| 4,429,106 | 1/1984 | Burzin et al. | 528/216 |
| 4,440,923 | 4/1984 | Bartmann | 528/216 |

FOREIGN PATENT DOCUMENTS 3602705 9/1986 Fed. Rep. of Germany .

*Primary Examiner*—Lorraine T. Kendell
*Attorney, Agent, or Firm*—Oblon, Fisher, Spivak, McClelland & Maier

[57] ABSTRACT

Structural components are produced which have at least 2 layers A and B. Layer A contains, as a matrix, a thermoplastic resin plastic containing a polyphenylene ether and fibrous reinforcing supports disposed therein. Layer B is a rubber which is obtained through the vulcanization of certain caoutchoucs containing double bonds.

12 Claims, No Drawings

STRUCTURAL COMPONENTS MADE FROM A FIBROUS REINFORCING SUPPORT AND RUBBER AND METHODS FOR THEIR MANUFACTURE

BACKGROUND OF THE INVENTION

1. Field of the Invention

The invention relates to structural components made from at least two securely adhering layers A and B, one of which is made from a fibrous reinforcing support and a thermoplastic resin and the other of which is made of rubber, as well as to methods for the manufacture of such structural components.

2. Discussion of the Background

It is known that a single material cannot always have all of the characteristics expected of an object. For example, high strength, rigidity or hardness on the one hand, and good oscillation dampening, malleability or skid resistance on the other, are not compatible. If an item is intended to possess all of these characteristics, composites of several materials are used.

An obvious solution in this case is a composite of metal and rubber.

This combination, however, has two important disadvantages:

1. Metals have a high density, i.e. the structural components made therefrom are heavy.
2. Metal and rubber are not easily bonded and providing the metal with an adhesion enhancer is difficult.

Composites between caoutchouc and glass or aramide fibers are known (see W. Kleeman "Mischungen fuer die Elastverarbeitung," VEB, Deutscher Verlag fuer Grundstoffindustrie, Leipzig, 1982, Chapter 20, pp. 296 et seq.). However, these systems do not provide for the manufacture of rigid plates or other rigid elements of any desired shape. It is also known to treat glass fibers with gamma-aminopropyltrimethoxysilane and then to inclose them in thermosetting plastics, such as formaldehyde-resorcinol copolymers or polyurethanes. In the last step, a composite with caoutchouc is achieved, for example, with the use of vinylpyridine copolymers. Thermosetting plastics, once they have hardened, are no longer deformable. Yet, for many applications this restriction is unsatisfactory.

Carbon fiber reinforced thermoplastic resins are described, for example, in the book, *Developments in Reinforced Plastics* -4, Elsevier Applied Science Publishers, 1984, by Paul E. McMahon. It is recognized that the systems described there would meet the above-described requirements, if the reinforced thermoplastic resin was to engage in a solid bond with caoutchouc. Examination shows that this is not the case. The vulcanized caoutchouc can be pulled away from the surface of the thermoplastic resins with a small force, i.e. less than 0.7 N/mm in the case of a composite of carbon fibers, polyether ether ketone, and E-SBRcaoutchouc. Therefore, according to the prior art, it is not possible to manufacture structural components of (a) thermoplastic resin and reinforcing fibers and (b) caoutchouc in a simple manner.

SUMMARY OF THE INVENTION

Accordingly, one object of the present invention is to provide composite structural components which exhibit high strength, rigidity and hardness and also good oscillation dampening, malleability and skid resistance.

Another object of the invention is to provide a composite material comprised of rubber and a thermoplastic resin reinforcing support which contains fibers, in which the rubber is solidly bonded to the support.

These and other objects which will become apparent from the following specification have been achieved by the structural component of the present invention which comprises (a) a support layer comprising a fibrous reinforcing support which comprises uncut non-metallic fibers and a matrix which comprises a polyphenylene ether or a thermoplastic resin which contains a polyphenylene ether and (b) a vulcanized rubber, wherein the structural component is produced by covulcanization of the support layer and the rubber.

DETAILED DESCRIPTION OF THE PREFERRED EMBODIMENTS

It has now been found that a combination of characteristics can be attained in structural components which are made from two layers A and B.

Solid layer A consists of uncut, non-metallic fibers coated with a thermoplastic resin containing polyphenylene ether (PPE). The thermoplastic resin can be either a thin coating or have the form of a matrix in which the fibers are embedded.

Layer B is comprised of rubber obtained through the vulcanization of caoutchouc containing double bonds. U.S. appliction Ser. No. 831,449, filed Feb. 20, 1986, now abandoned and refiled as continuation application Ser. No. 115,567, filed Oct. 29, 1987 discloses a "Method for the Manufacture of a Chemical Composite Between Shaped Objects Based on Polyphenylene Ethers on the One Hand and Caoutchoucs Vulcanized with Sulphur and Containing Double Bonds on the Other Hand." However, this application provides no suggestion that non-metallic fibers can be used in the composite. In addition, it is important that the fibers are uncut, since cut fibers are used almost exclusively for thermoplastic resins. Finally, the proportion of fibers is in no way limited to 50%.

The thermoplastic resin of the layer A contains polyphenylene ether as its most important component, and can also contain flow enhancers and other additives.

A preferred polyphenylene ether is a polyether based on 2,6-dimethylphenol, in which the ether oxygen of one unit is bonded to the benzene ring of the adjacent unit. At least 50 such units should be connected with each other.

Of course, other o,o'-dialkylphenols can be used. The alkyl substituents have at most 6 carbon atoms, and should not have a tertiary carbon atom in the α-position relative to the ring. Also suitable are phenols which are substituted in one ortho-position with a tertiary alkyl group, particularly with a tertiary butyl group. Each of the monomeric phenols listed can be substituted with a methyl group in the 3 position, and optionally also in the 5 position. Mixtures of the monomeric phenols can also be used. The polyphenylene ethers can be manufactured from the phenols, for example in the presence of complex-forming agents such as copper bromide and morpholine (see DE-0S 32 24 692 and OS 32 24 691). The viscosity value J, which is determined according to DIN 53 728 in chloroform at 25° C lies in the range from 25 to 90 $cm^3/g$. Preferred is the polymer of 2,6-dimethylphenol, i.e., poly-(2,6-dimethyl-1,4-phenylene-ether).

Low molecular weight compounds such as ester plasticizers or aromatics which are soluble in PPE can be added to the PPE in quantities up to 50%, preferably up to 20%, as flow enhancers.

Preferred ester plasticizers are organic esters of phosphorous acid; organic esters of phosphoric acid; phthalic acid esters, with alcohols having up to 15 carbon atoms; esters of aliphatic or aromatic dicarboxylic acids having aliphatic or aliphatic-aromatic alcohols; and oligoesters of the above-described acids with diols, whereby the maximum proportion of the diol is 20%, relative to the quantity of monomeric ester.

Preferred aromatics are compounds having up to 5 aromatic rings and optionally, other functional groups. Examples include benzyl toluene, dibenzyl toluene, toluene and xylene.

Other additive agents include polymeric additives, such as known impact resistance enhancers for PPE. Preferred are polyoctenylenes, styrene-butadiene-styrene block copolymers and styrene polymerisates modified with regard to their impact resistance. Homopolystyrene polymerisates can also be added. However, as a rule the desired composite is not improved by these types of additives. Therefore, the proportion of these additives is preferably less than 20%.

The fibrous reinforcing support consists of uncut, nonmetallic fibers such as carbon, aramide or glass fibers. The fibers can be present, for example, in the form of yarns, weaves, mats, felts, rovings or as individual fibers. The glass fibers are generally treated with a fiber coating by the manufacturer.

The shape and size of the bonded layers in the structural component can vary widely. They can be practically identical, as in sandwich structures, or they can be unequal, as in large surface area rubber mats with reinforced edge areas or as in large-surface area rigid elements with rubber feet. The size and shape of the layers A and B is thus not important. All that matters is that the layers A and B are connected with each other at a common, uninterrupted surface if possible. The structural components must consist of at least 2 layers A and B. But 3 or more layers preferably in an alternating sequence such as ABAB or BABA, etc., can also be provided. Example 1, for instance, describes composite plates of rubber, and a thermoplastic resin containing PPE and wrapped in carbon fibers.

The stiffness and strength of layer A is determined by the type, arrangement and quantity of the fibrous reinforcing supports and by the composition of the matrix.

The following caoutchoucs vulcanized with sulphur and containing double bonds are suitable as component B. All of these are disclosed in German Patent Application P 36 02 705.7:

(1) Styrene-butadiene-caoutchouc

This can involve both E- and L-SBR-caoutchouc having a styrene component of between 18-40 percent by weight. Oil-extended SBR caoutchoucs are also suitable. The caoutchouc can be present in bead form. It is more economical, however, to use a powdered caoutchouc containing a filler.

E-SBR caoutchouc is manufactured in a known manner by emulsion polymerizing from 15-40 percent by weight styrene and a corresponding quantity of 85-60 percent by weight butadiene. A caoutchouc of this type is described, for example, in the trade magazine BUNA ® EM No. 601 of the Bunawerke Huels GmbH, September 1982 edition. Its Mooney-viscosity $ML_{(1+4)}$, 100° C., lies between 30-120 (see Mooney, Rubber Chem. Techn. 30, 460 (1957)).

The covulcanizable caoutchouc mixtures always contain fillers such as carbon black or silicic acid, extender agents such as mineral oils, vulcanization agents such as sulphur, vulcanization accelerators and aging prevention agents. A particularly preferred processing enhancer is polyoctenylene (A. Draexler, Kautschuk +Gummi, Kunststoffe 1983, pp. 1037 to 1043).

The added mineral oils can be paraffinic, naphthenic or aromatic.

(2) Butadiene-Caoutchouc

BR-caoutchoucs are preferable regardless of whether they were manufactured with Li or Co catalysts. In addition, the quantity of the cis-1,4-isomer has no influence on the suitability of the type of caoutchouc. The use of polyoctenylene as a processing enhancer is also preferred here.

(3) Polyisoprene

Synthetic IR-caoutchoucs are preferred, regardless of whether they were manufactured with Ti or Li catalysts. 3,4-IR caoutchoucs can also be used. Accrrdingly, the cis-1,4/trans-1,4 or 1,2- and 3,4-content has no effect on the adhesion characteristics.

(4) Isobutene-isoprene-caoutchoucs

IIR caoutchoucs are also directly suitable. Halogenated varieties require additional mixture components.

(5) Mixtures of the following caoutchouc types with each other: SBR (styrene-butadiene caoutchouc), BR (butandiene caoutchouc), IR (isoprene caoutchouc) and IIR (isoburene-isoprene caoutchouc).

These mixtures preferably have 2 or 3 components. Especially good results are achieved with mixtures of different weight components of SBR and BR caoutchouc.

(6) Caoutchouc mixtures containing NR (natural caoutchouc), CR (chloroprene caoutchouc), NBR (acrylonitrile-butadiene caoutchouc) and/or CIIR (chlorinated isobutylene-isoprene caoutchouc).

These are mixtures of the caoutchouc components 1 through 5 with the above-listed caoutchouc types, whereby the proportion of the latter can total as much as 80 percent by weight.

The styrene-butadiene-caoutchouc according to (1) is particularly preferred for the method according to the invention.

The manufacture of the listed types of caoutchoucs takes place according to methods known in the literature (see W. Hofmann, Kautschuktechnologie, Gentner-Verlag, Stuttgart, 1980).

The caoutchouc surfaces can be treated, for example, in accordance with the method disclosed in EP-OS 0 141 087.

The manufacture of the structural components basically takes place in 2 steps. First, the layer A is produced, and subsequently, the structural component is manufactured through covulcanization with the caoutchouc.

In the first step the fibrous reinforcing supports are saturated with a solution of the thermoplastic resin. Any solvent is suitable which is capable of dissolving the polyphenylene ether, i.e., even chlorinated hydrocarbons. Solvents are preferred which evaporate easily, such as toluene, xylene, or benzene. The solvent is then removed, and layer A is shaped either simultaneously therewith or subsequent thereto. This preferably takes place at an elevated temperature and in some cases under vacuum or excess pressure. In the case of rovings, the manufacture of the layer A includes the following method steps:

(1) Submersion and saturation with a solution of the matrix material,
(2) Extension until the fibers are parallel,
(2a) In some cases, placement or coiling the saturated rovings,
(3) Drying,
(3a) In some cases, heating and shaping above the softening temperature, optionally under pressure,
(4) In some cases, coating the reinforcing support with PPE through a thermoplastic processing method.

In some cases it is advisable to repeat the saturation

Additives

Carbon Fibers: Commercial carbon fiber rovings E/XA-S 12 K of the company Hysol Grafil Ltd., Coventry, England.

Aramide Cord: Commercial filament yarn of Kevlar 49 from Du Pont Co., CH-1211 Geneva 24, Switzerland.

Glass Fibers: Commercial VETROTEX ®—Textile glass Roving EC-10-9600-P 388 from the company Gevetex Textilglas-GmbH, D5100 Aachen.

PPE: PPE dissolved in toluene, such as is provided in accordance with DE-OS 33 13 864 after the reaction extraction. The viscosity values of the polymers (determined in chloroform according to DIN 53 728) are given respectively.

TABLE 3

| Example No. | Reinforcement Support | Viscosity value of the PPE ml/g | Proportions of the Thermoplastic Resin in the Saturation Bath | Mass Ratio - Reinforcement Support:Thermoplastic Resin | Separating Force N/mm |
|---|---|---|---|---|---|
| A | C Fiber | — | — | — | 0.4 |
| 1 | C Fiber | 25 | PPE 15* | 66:34 | 4.3 |
| 2 | C Fiber | 59 | PPE 15 | 62:38 | 9.2 |
| 3 | C Fiber | 83 | PPE 15 | 57:43 | 8.5 |
| 4 | C Fiber | 59 | PPE:TPP - 15:1.5* | 52.48 | 8.0 |
| 5 | C Fiber | 59 | PPE:TOR:DBT - 15:1.5:1.5 | 54.46 | 6.3 |
| B | Aramide Cord | — | — | — | 0.67 |
| 6 | Aramide Cord | 59 | PPE: 15 | 48:52 | 6.7 |
| 7 | Aramide Cord | 59 | PPE:TOR:TPP - 15:1.5:1.5 | 50:50 | 7.5 |
| C | Glass Fiber | — | — | — | 0.67 |
| 8 | Glass Fiber | 59 | PPE 15 | 83:17 | 4.8 |
| 9 | Glass Fiber | 59 | PPE:TOR:TPP = 15:1.5:1.5 | 75:25 | 5.0 |

*The numbers indicate the % of the respective materials in the solution of the thermoplastic resin that are used in the saturation.

and removal of the solvent. With woven fabric or felts, for example, a homogenous interlocking of the fibers can be assured by manipulating or squeezing them.

Dissolving the thermoplastic resins in the following manner is particularly preferred. The toluene solution occurring due to the oxidative coupling of 2,6-dimethylphenol is freed of residual catalyst in a known manner, flow enhancer and other additives are added if desired, and is then thinned or thickened to the concentration which is most favorable for the saturation of the fibrous reinforcing support. Of course, the solution can also be produced by dissolving solid PPE in the solvent. Saturated solutions having a relatively low PPE concentration, such as 5 percent, are particularly preferred for the manufacture of layers with a high proportion by weight of reinforcing fiber. High-percentage solutions, such as 50% solutions, are particularly well suited for the manufacture of layers with a high proportion by weight of thermoplastic resin.

The production of the structural components which are comprised of rigid and rubber-elastic layers can take place in various ways, such as by compression under vulcanization conditions, by extrusion coating of prepared rovings or prefabricated rigid shaped elements with caoutchouc and vulcanization, or by the spraying of prefabricated rigid elements under vulcanization conditions.

The caoutchouc used in the structural components can be reinforced by known means, such as by casings. Additional auxiliary items such as spacers, clamps or supports made from reinforced or unreinforced PPE can also be used. When used, these items are still in place during vulcanization and are lost for future use, remaining in the structural component.

Impact Resistance Agents: A polyoctenylene was used with a viscosity value of 120 ml/g and a transcontent of 80%. A product of this type is commercially available under the name VESTENAMER ® 8012 (Manufacturer: Huels A.G., D- 4370 Marl 1). Additional characterizing data for this product can be obtained from the periodical "Kautschuk, Gummi, Kunststoffe" 1981, pp. 185 to 190, as well as from the Huels brochure No. 2247, "VESTENAMER ® 8012." The polyoctenylene can also be manufactured, for example, in accordance with K.J. Ivin "Olefin Metathesis," Academic Press, pp. 236 et seq., 1983, and the literature citations given therein.

Flow Enhancers: Triphenyl phosphate (TPP)

MARLOTHERM ® S (DBT), a mixture of isomeric dibenzyl toluenes, commercial product of Huels A.G., D-4370 Marl 1.

Caoutchoucs: A carbon-black filled, softener-containing E-SBR-powdered caoutchouc is manufactured by mixing the following components:

| Parts by Weight | Material |
|---|---|
| 160 | Powdered caoutchouc, consisting of 100 parts E-SBR-caoutchouc (styrene content 23 percent by weight) and 60 parts carbon black (company brochure of HUELS AKTIENGESELLSCHAFT, No. 5214 from October 1983 "Filler-containing Caoutchouc Powder BUNA ® EM") |
| 1 | Stearic acid |
| 4 | Zinc oxide |
| 1 | N—isopropyl-N'—phenyl-p-phenylene diamine |
| 1 | N—(1,3-dimethylbutyl)-N'—phenyl-p-phenylene diamine |
| 2.5 | a commercially available aging prevention agent against light and ozone (Antilux ® 111). This is a paraffinic wax with broad molecular |

| Parts by Weight | Material |
|---|---|
| | weight distribution and high molecular weight agents. (Manufacturer: Rhein-Chemie Co., D-6800 Mannheim). |
| 1.8 | Sulphur |
| 1.3 | N—cyclohexyl-1-benzothiazolsulphenamide |
| 0.8 | Tetramethyl thiuramdisulphide |
| 0.5 | Diphenyl guanidine |
| 0.3 | zinc diethyl dithiocarbamate |
| 40 | a common commercial aromatic mineral oil softener |

The mixture is rolled out within 5 minutes at 50° C. to a 2 mm thick sheet.

Other features of the invention will become apparent in the course of the following descriptions of exemplary embodiments which are given for illustration of the invention and are not intended to be limiting thereof.

EXAMPLES

Example 1

MANUFACTURE AND CHARACTERISTICS OF COMPOSITE PLATES MADE FROM A CARBON FIBER/PPE COMPOSITE AND CAOUTCHUOC

1.1 Pretreatment of the Carbon Fibers

The carbon fiber rovings are saturated in a 15% toluene solution of PPE (viscosity value=25 ml/g) heated to 70° C, whereby the rovings in the solution are swelled by being crushed before they are brought back into parallel positions by being stretched out. The rovings that have been saturated in this manner are dried while lying straight at 100° C. in a vacuum until constant weight is achieved. The ratio of carbon fibers to PPE is determined by comparative weighings.

1.2 Plates Made from a Carbon Fiber/PPE Composite

The treated strands are laid parallel and pressed into plates in a 100×100×1 mm pressing frame at 300° C. and 200 bar.

1.3 Composite Plates with Caoutchouc

One frontal side of the plate according to 1.2 is covered with a 20 mm wide strip of aluminum foil, which later serves as the separating means between the covulcanized layers and makes it possible to clamp the individual layers into the test apparatus. The plate is then coated with caoutchouc and the layers are covulcanized within five minutes at 180° C. to a composite plate of 2 mm total thickness.

1.4 Separation Test

The composite plates are cut into 30 mm wide strips in the longitudinal direction of the fiber orientation and subjected to a separation test in accordance with DIN 53 539.

1.5 Elasticity Module

The elasticity modulus of the strips separated from the caoutchouc during the separation test in according to DIN 53 457 section 2.1.

1.6 Effect on the Composite of Long-term Vibration Loads

120×18 mm samples with a surface area of 10 mm are cut from the composite plates according to 1.3 and are subjected to a long-term vibration test in accordance with DIN 53 442 at a frequency of 10 Hz and a bending angle of 15°

1.7 Results

The following characteristics were determined for EXAMPLE 1:

TABLE 1

| Ratio of Carbon Fibers to Binding Agents | Separation Force N/mm According to 1.4 | E modulus N/mm | Separation Force N/mm After Long-term Vibration Tests Numbers of Load Alterations | | | | |
|---|---|---|---|---|---|---|---|
| | | | 0 | $2 \cdot 10^6$ | $4 \cdot 10^6$ | $6 \cdot 10^6$ | $8 \cdot 10^6$ |
| 66:34 | 4.3 | 190,000 | 3.0 | 3.0 | 4.8 | 4.1 | 4.4 |

EXAMPLES 2-9, COMPARISON EXAMPLES A-C

The composition and experimental test data are shown in the Table 2.

The plates and caoutchouc composites are prepared according to Example 1 and subjected to a separation test according to DIN 53 539. For purposes of the comparison tests the fibers were not treated with the solution of a thermoplastic resin.

EXAMPLES 10-15, COMPARISON EXAMPLES D-F

Solutions of
(I) 15% PPE of viscosity value 45 ml/g, or
(II) 15% PPE of viscosity value 45 ml/g,
1.5% VESTENAMER ® 8012, and 1.5% triphenyl phosphate in toluene were used as the saturation agent for treatment of the rovings and cords.

The reinforcing support was treated with the saturating agent, as described in Example 1, dried and tested for its adhesion strength to caoutchouc, which was vulcanized within 5 minutes at 180° C. The method corresponds to the standard ISO/DIS 4679 of Dec. 7, 1979 (average value from 12 individual tests, H-test).

TABLE 2

| Example No. | Reinforcing Support | Saturation Agent | Adhesion Strength |
|---|---|---|---|
| D | C Fiber Roving | — | 31 |
| 10 | C Fiber Roving | I | 71 |
| 11 | C Fiber Robing | II | 79 |
| E | Aramide Cord | — | 35 |
| 12 | Aramide Cord | I | 47 |
| 13 | Aramide Cord | II | 55 |
| F | Glass Fiber Roving | — | 26 |
| 14 | Glass Fiber Roving | I | 52 |
| 15 | Glass Fiber Roving | II | 62 |

The structural components can be used in many ways. With a unidirectional alignment of the reinforcing support the primary uses are side protection elements for the automotive sector, such as side strips, door attachments, entry safety strips, and door sill scuff plates. An additional area for use is conveyor belts or air-filled tires, whereby the surfaces can be reinforced by casings in well-known ways.

Areas of use in which the reinforcing supports are aligned orthotropically or quasi-isotropically relate to slip-resistant plates, and doors and flaps with sealing lips.

Multiple sandwich structures of very thin layers of reinforcing supports and caoutchouc with a preferably quasiisotropic arrangement of the reinforcing support are used for light armor.

The results of the comparison tests demonstrate that the adhesion strength values are reduced when a composite is manufactured of fibers and caoutchouc without thermoplastic resins.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A structural component, comprising:
   (a) a support layer, comprising a fibrous reinforcing support which comprises uncut non-metallic fibers and a matrix which comprises a polyphenylene ether or a thermoplastic resin which contains a polyphenylene ether, and
   (b) a vulcanized rubber layer, wherein said structural component is produced by covulcanization of said support layer and said rubber.

2. The structural support of claim 1, wherein said non-metallic fibers are selected from the group consisting of carbon, aramide and glass fibers.

3. The structural component of claim 1, wherein said fibrous reinforcing support is in the form of yarns, woven fabrics, mats, felts, rovings or individual fibers.

4. The structural component of claim 1, wherein said polyphenylene ether and said thermoplastic resin are in the form of a thin coating over said fibrous reinforcing support or in the form of a matrix in which said fibrous reinforcing support is embedded.

5. The structural component of claim 1, wherein said polyphenylene ether comprises o,o'-dialkylphenol monomer units, wherein the alkyl groups on said dialkylphenol have 1–6 carbon atoms.

6. The structural component of claim 5, wherein said o,o'-dialkylphenol is 2,6-dimethylphenol.

7. The structural component of claim 5, wherein said dialkylphenol is substitued in the 3- or 5-position with a methyl group.

8. The structural component of claim 1, wherein said polyphenylene ether or said thermoplastic resin further comprises an ester plasticizers, an impact resistance agent, a flow enhancer, or mixtures thereof.

9. The structural component of claim 8, wherein said ester plasticizer is selected from the group consisting of organic esters of phosphorous acid, organic esters of phosphoric acid, phthalic acid esters with $C_{1-14}$ alcohols, esters of aliphatic or aromatic dicarboxylic acids with aliphatic or aliphatic-aromatic alcohols, and oligoesters of diols with phosphorous acid, phosphoric acid, phthalic acid and aliphatic or aromatic dicarboxylic acids.

10. The structural component of claim 8, wherein said impact resistance enhancer is a polyoctenylene.

11. The structural component of claim 1, wherein said vulcanized rubber is selected from the group consisting of styrene-butadiene-caoutchoucs, butadiene caoutchoucs, isoprene-caoutchoucs, isobutene-isoprene-caoutchoucs, mixtures of styrene-butandiene, butandiene, isoprene and isobutene-isoprene caoutchoucs, and caoutchouc mixtures containing natural caoutchoucs, chloroprenes, acrylonitrile-butadiene caoutchoucs and chlorinated isobutylene-isoprene caoutchoucs.

12. The structural component of claim 1, wherein said rubber is a styrene-butadiene caoutchouc.

* * * * *